(12) United States Patent
McClain

(10) Patent No.: US 6,390,239 B1
(45) Date of Patent: May 21, 2002

(54) TREE STAND THEFT PREVENTION DEVICE

(76) Inventor: James S. McClain, 112 Chadrick Dr., Madison, AL (US) 35758

(*) Notice: Subject to any disclaimer, the term of this patent is extended or adjusted under 35 U.S.C. 154(b) by 0 days.

(21) Appl. No.: 09/633,656

(22) Filed: Aug. 7, 2000

Related U.S. Application Data

(60) Provisional application No. 60/199,626, filed on Apr. 25, 2000.

(51) Int. Cl.[7] .............................................. A01M 31/02
(52) U.S. Cl. ............................ 182/187; 248/553; 70/58
(58) Field of Search ................. 182/187; 248/551–553; 70/58, 62, 61, 63

(56) References Cited

U.S. PATENT DOCUMENTS

| | | | |
|---|---|---|---|
| 4,401,247 A | * | 8/1983 | Zoor |
| 4,557,458 A | * | 12/1985 | Vahlberg |
| 5,433,094 A | * | 7/1995 | Sandin |
| 5,562,180 A | * | 10/1996 | Herzog |

* cited by examiner

Primary Examiner—Alvin Chin-Shue
(74) Attorney, Agent, or Firm—Joseph H. Beumer

(57) ABSTRACT

A theft prevention device for fixed-position tree stands employs a horizontal plate with ends bent over to engage a pair of upright supports of the tree stand. The plate has a hole at a central location through which a lag bolt extends, securing the plate to a tree. Barriers to access to the bolt along its length and at the bolt head are provided. A barrier underneath the plate takes the form of side plates connected to edges of both sides of the horizontal plate or a hub surrounding the bolt. An outside barrier protecting the bolt head is provided by a hub and a plug lock engaged with the hub.

5 Claims, 4 Drawing Sheets

TREE STAND THEFT PREVENTION DEVICE

CROSS REFERENCE TO RELATED APPLICATION

This application claims the benefit of provisional application Ser. No. 60/199,626, filed Apr. 25, 2000, by the present applicant.

FIELD OF THE INVENTION

This invention relates to tree stands and more particularly to devices for securing "fixed position" type tree stands.

BACKGROUND OF THE INVENTION

Tree stands are widely used by deer hunters to provide a vantage point for the hunter at a location likely to be frequented by deer. While tree stands are intended to be installed in a tree and moved to a new location as needed, it would be inconvenient to take the stand down at the end of each day's hunting. In many instances it would be desirable to leave the stand in place for future hunts at the same location or to track down a wounded animal. However, leaving a valuable tree stand unattended in the woods may present an attractive target for thieves. Tree stands are generally designed for easy removal by loosening retention hardware such as cinch belts or clamps, which are made readily accessible and which require a minimum of tools for disassembling the stand and bringing it down.

Various types of tree stands are currently in use, and each type would require a different approach to being made more secure against removal by thieves. In general, tree stands come in three types: 1) climbing; 2) ladder; and, 3) fixed position. The present invention is directed to one piece, fixed-position stands having a pair of upright metal supports disposed against the tree on which the stand is installed.

The only prior art anti-theft measure for tree stands known to applicant is a padlock and chain as disclosed in U.S. Pat. No. 5,732,793, issued Mar. 31, 1998, to Dech. Such device could be readily defeated by use of a bolt clipper or a hack saw.

SUMMARY OF THE INVENTION

The present invention provides a security device for fixed-position tree stands having a pair of upright support members disposed against a tree. Support members for this type of stand typically have a seat connected to their upper ends and a standing platform connected to their lower ends. The present device comprises a first horizontally disposed metal plate having bent-over ends that snugly engage each of the upright members in a manner such as to prevent the plate from being twisted out of position once it is installed. A hole is provided in the plate at a central location for passage of a lag bolt from the outside of the plate and into tight engagement with the tree. All portions of the bolt along its length between the tree and the plate are made inaccessible from the radial direction by placement of a barrier connected to the plate and shielding the bolt from contact.

The barrier between the plate and the tree may comprise a pair of metal shields in the form of second and third plates disposed normal to the first plate on each side thereof and extending over the space between upright supports. A hub surrounding the bolt on the inside of the first plate may also be used for this purpose.

Outside of the first plate only the head of the bolt would be accessible, and such access is denied by a hub surrounding the bolt hole and connected to the outside of the plate and a plug-type lock insertable into the hub.

Removal of the tree stand, which would require removal or destruction of the bolt, is thus made substantially more difficult by denying access to the bolt head by the lock and access to the side of the bolt is restricted by barriers. Ordinary tools such as bolt clippers and wrenches would not suffice for loosening the stand so that potential thieves may well be discouraged.

It is, therefore, an object of this invention to provide a deterrent to removal of fixed-position tree stands from engagement with a tree.

Another object is to deny access to a lag bolt securing upright support members against a tree.

DESCRIPTION OF THE PREFERRED EMBODIMENT

Figure 1:
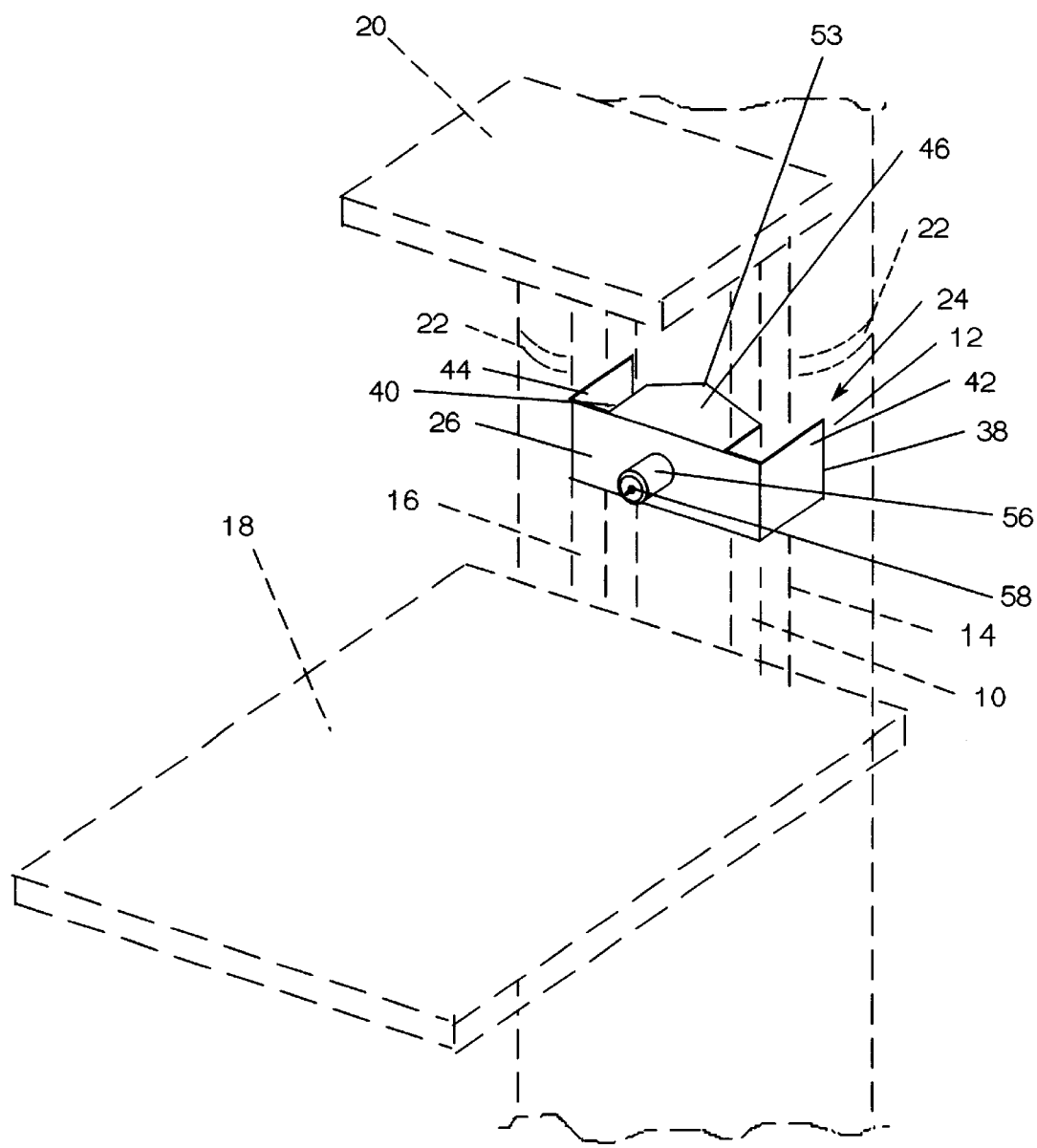
FIG. 1 is a perspective view showing a theft-prevention device of this invention installed on upright support members of a fixed-position tree stand (shown in dotted lines)

Referring to FIG. 1 of the drawings, there is shown a tree stand 10 mounted on a tree 12. The tree stand has a pair of upright supports 14, 16 in the form of square metal tubing which as shown are disposed flush against the tree. Bottom ends of upright supports have attached thereto, by means not shown, a standing platform 18 positioned at a right angle to the supports. A seat 20 is similarly secured to top ends of the upright supports. A cinch belt 22 is connected to the upright supports and is held tight by a buckle (not shown).

The theft prevention device 24 (FIG. 2 and FIG. 3) includes a heavy metal plate 26 having a hole 28 for passage of lag bolt 30 having pointed end 32 and spiral threads 34 for engaging the tree. The bolt 30 has a hexagonal head 36 for grasping by a socket wrench or the like for loosening or tightening the bolt against the tree. Ends 38, 40 of the metal plate are bent over at substantially right angles to provide segments 42, 44 which fit snugly over side faces of the upright supports and which keep the plate from being disengaged from the uprights by twisting. To provide the desired fit segments 42, 44 preferably have a length equal to ½ inch greater than the width of the side of the support member which they come into contact with. This would be one and one-half inch for one inch square tubing. The extended length of these segments also serves to compensate for curvature of the tree.

Access to the bolt from a side in the space between the plate and tree on which it is installed is restricted by a pair of plates, 46, 48 connected to side edges of plate 26 and extending inward perpendicularly toward the tree. The plates have a length such as to extend across substantially the entire space between upright support members when installed. The side plates 46, 48 may have a triangular portion 50, 52 at their distal ends providing a point 53, 54 in a central position which may be driven into the tree as may be required for closing any gap between these plates and the tree.

A hub 56 is placed so as to surround the bolt head 36, the hub being connected to plate 26 by means such as welding. The hub is sized to provide space for insertion and operation of a socket wrench for installation and removal of the device. The hub is adapted to receive and be engaged by a plug lock.

Figure 2:
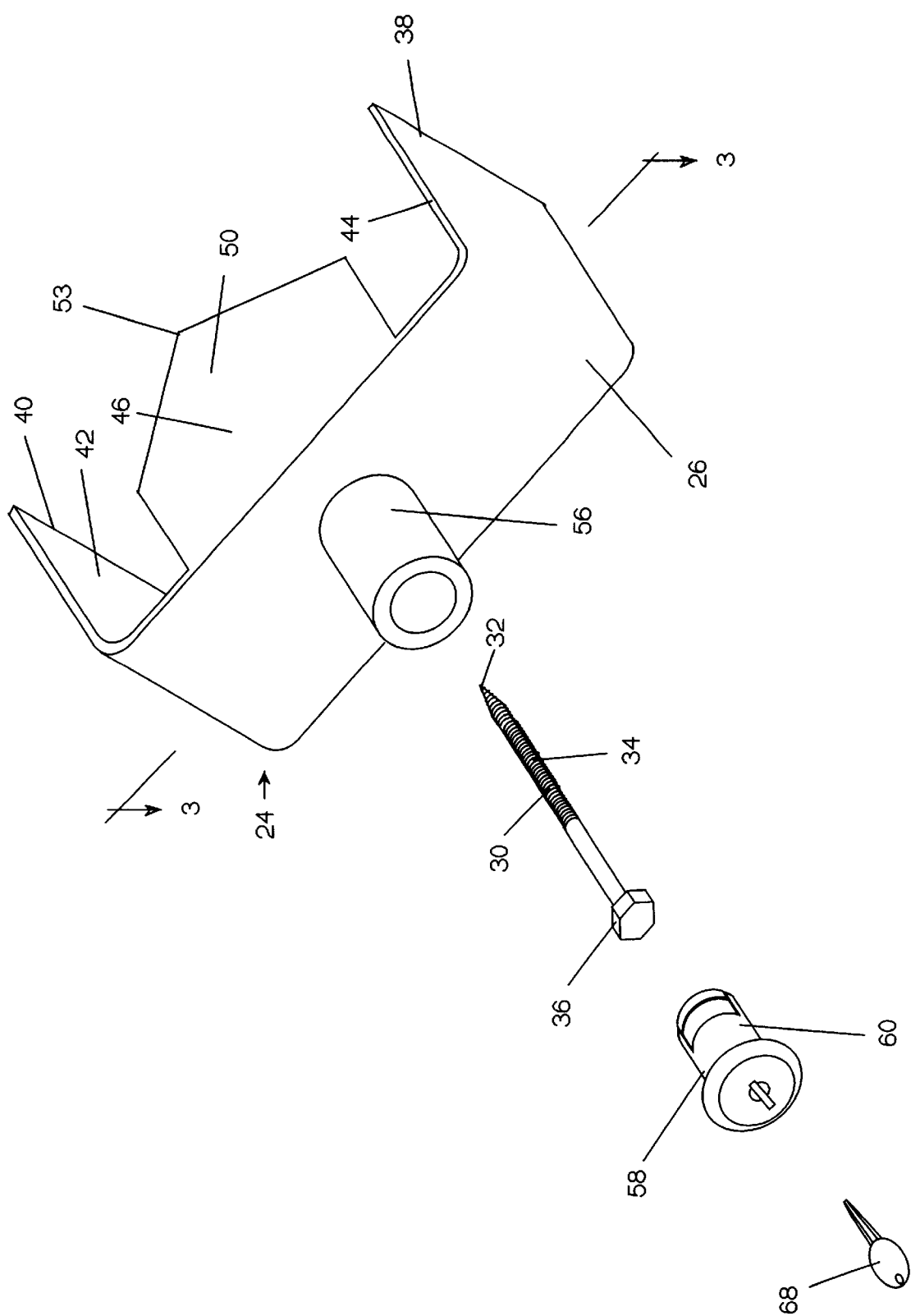
FIG. 2 is an exploded view showing more details of the device of FIG. 1.
Figure 3:
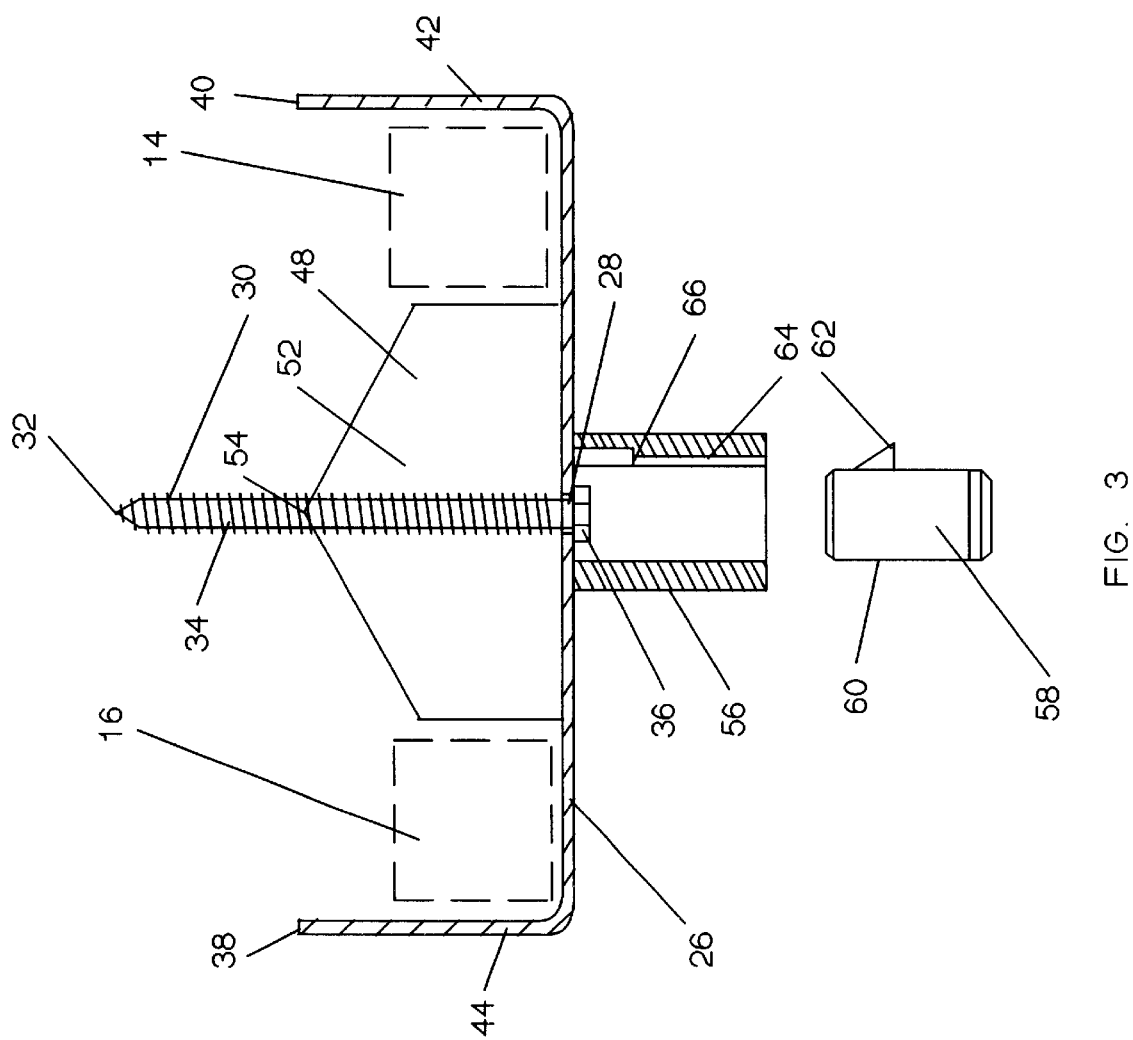
FIG. 3 is a sectional view taken along line 3—3 of FIG. 2.

As shown in FIGS. 2 and 3, plug lock 58 has a barrel portion 60 that fits snugly within hub 56 and a projecting catch 62 which comes into locking engagement with a mating shoulder 66 within a slot 64 of the hub. Release of the catch is enabled by use of a key 68.

Figure 4:
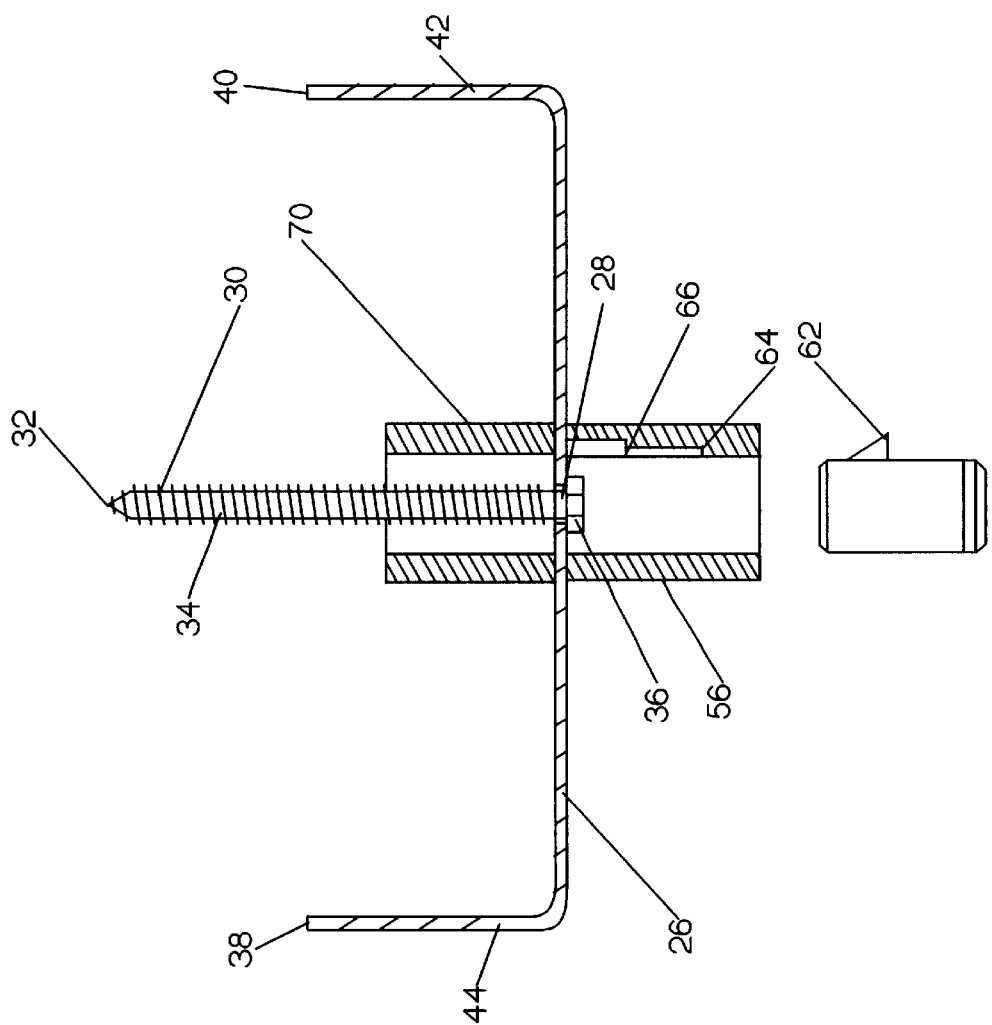
FIG. 4 is a sectional view showing an alternate embodiment of the invention.

An alternate embodiment is shown in FIG. 4. This embodiment differs from the one described above in that side access to the bolt in the space between the first plate and a tree is denied by means of an inner hub 70 similar to outer hub 56, connected to the inside surface of plate and surrounding the bolt. The inner hub preferably would have a length corresponding to segments 42, 44 so as to come into contact with the tree.

Certain available fixed-position tree stands, in particular the "Baby Grand" model manufactured by the API Company, come equipped with a plate extending over upright supports and an elongated T-screw used to help stabilize the stand. The screw is driven into the tree and removed by hand turning of the T portion, which is readily accessible from the outside of the plate. This arrangement, of course, facilitates removal. For this model of tree stand, the plate and T screw could be easily replaced by the device of this invention to obtain improved security as well as stability.

In order to provide effective protection, components of this theft prevention device should be made of high-strength corrosion-resistant materials and should be thick and sturdy enough to deter attempts of removal by ordinary tools. The first plate may be comprised of a high-strength aluminum alloy and have a thickness such as ¼ inch. The length of this plate would depend on the distance between upright support members, typically about six inches, and the width may be three inches. The bolt may have a diameter of 5/16th or 3/8th inch and a length of 4 to 6 inches. A high-strength bolt made of stainless steel is preferred.

The first plate and attached metal barriers may be fabricated by conventional methods such as welding or stamping of plate members. Hubs surrounding the lug bolt may be formed by casting or machining and joined to the plate by welding or the like.

While the invention is described in terms of using a lag bolt having a head engageable with a socket wrench, it is to be understood that instead of a "bolt," a "screw" having a head engageable with a screw driver may also be used. Other characteristics, such as preferred length and diameter of the screw, would be the same as for a bolt.

The invention is not to be understood as limited to the embodiments described above or details thereof, but is limited only as defined in the appended claims.

What is claimed is:

1. A device for preventing theft of a tree stand having a pair of vertical support members adapted to be placed against a tree trunk, said device comprising, in combination:

a pair of parallel, spaced-apart vertical support members incorporated in the tree stand;

a first, generally U-shaped plate having a flat, rectangular central portion, a first end portion and a second end portion, each of said end portions extending inward with respect to said central portion and defining a corner engageable with a said vertical support member, said central portion having an upper edge and a lower edge;

said central portion having a hole defined therethrough at a middle location;

a lag bolt or screw insertable through said hole for being screwed into the tree trunk, a portion of the bolt or screw along a length thereof being located inside of said central portion and a bolt or screw head being located outside of said central portion;

an inside barrier connected to said first plate and adapted for shielding said bolt or screw from access inside of said first plate, said inside barrier comprising a second plate connected to said first plate along said upper edge of said central portion and disposed perpendicular thereto and a third plate connected to said first plate along said lower edge of said central portion and disposed perpendicular thereto, said second plate and said third plate, each having a triangular portion at a distal end thereof, each of said triangular portions having a point adapted for being driven into the tree trunk; and an outside barrier shielding said bolt or screw from access outside of said first plate.

2. The device as defined in claim 1 wherein said outside barrier comprises a first axially extending hub connected to an outside surface of said first plate and encircling said bolt head.

3. The device as defined in claim 2 further comprising a plug lock engageable with said first hub and preventing access to said head from a direction axial to said bolt.

4. The device as defined in claim 1 wherein said support members each have a rectangular cross section and said end portions of said first plate are disposed at a right angle to a middle portion of said first plate.

5. The device as defined in claim 1 wherein said bolt or screw is a bolt.

* * * * *